(12) United States Patent
Kanaoka et al.

(10) Patent No.: US 10,523,828 B2
(45) Date of Patent: Dec. 31, 2019

(54) IMAGE FORMING APPARATUS INCLUDING A HOUSING USED AS PAPER OUTPUT TRAY

(71) Applicant: SHARP KABUSHIKI KAISHA, Sakai, Osaka (JP)

(72) Inventors: Yukio Kanaoka, Sakai (JP); Masaaki Aida, Sakai (JP); Hidetoshi Fujimoto, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/866,739

(22) Filed: Jan. 10, 2018

(65) Prior Publication Data

US 2018/0205842 A1  Jul. 19, 2018

(30) Foreign Application Priority Data

Jan. 19, 2017 (JP) .................................. 2017-007196

(51) Int. Cl.
| | | |
|---|---|---|
| *G06F 3/12* | (2006.01) | |
| *H04N 1/00* | (2006.01) | |
| *B65H 31/34* | (2006.01) | |
| *B65H 3/44* | (2006.01) | |
| *B65H 7/20* | (2006.01) | |
| *B65H 31/10* | (2006.01) | |
| *B65H 1/26* | (2006.01) | |
| *B65H 29/60* | (2006.01) | |
| *G03G 15/00* | (2006.01) | |

(52) U.S. Cl.
CPC ......... *H04N 1/00411* (2013.01); *B65H 1/266* (2013.01); *B65H 3/44* (2013.01); *B65H 7/20* (2013.01); *B65H 29/60* (2013.01); *B65H 31/10* (2013.01); *B65H 31/34* (2013.01); *B65H 2801/06* (2013.01); *G03G 15/6538* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,727,387 A | * | 2/1988 | Israely | ................. G03G 15/326 346/134 |
| 5,887,239 A | * | 3/1999 | Hong | .................... B65H 31/02 271/161 |

(Continued)

FOREIGN PATENT DOCUMENTS

| | | |
|---|---|---|
| JP | 2008-133112 A | 6/2008 |
| JP | 2010-062940 A | 3/2010 |

*Primary Examiner* — Dung D Tran
(74) *Attorney, Agent, or Firm* — ScienBiziP, P.C.

(57) ABSTRACT

An image forming apparatus includes a housing in which an image forming section is contained and a paper output section into which a sheet of paper on which an image has been formed is ejected. The paper output section includes a paper output tray that supports the front side or back side of the sheet of paper, a back-end supporting member that supports a back end of the sheet of paper in a paper ejection direction, and a paper takeout slot through which the sheet of paper is taken out. The paper output section is provided at the outer edge of the interior of the housing. The housing has an external wall whose inner face side is used as the paper output tray. The paper takeout slot opens upward.

12 Claims, 13 Drawing Sheets

(56) References Cited

U.S. PATENT DOCUMENTS

| | | | | |
|---|---|---|---|---|
| 6,011,940 A * | 1/2000 | Van Lydegraf | ...... | G03G 15/221 399/405 |
| 6,845,228 B2 * | 1/2005 | Suzuki | ............... | H04N 1/00525 399/407 |
| 7,343,124 B2 * | 3/2008 | Uehara | .............. | G03G 15/6502 399/299 |
| 7,636,528 B2 * | 12/2009 | Sato | ........................ | G03G 15/00 399/107 |
| 9,733,609 B2 * | 8/2017 | Koyama | ............ | G03G 15/6573 |
| 2006/0024094 A1 * | 2/2006 | Uehara | .............. | G03G 15/6502 399/299 |
| 2006/0221170 A1 * | 10/2006 | Sato | ........................ | G03G 15/00 347/138 |
| 2008/0118292 A1 * | 5/2008 | Uehara | .............. | G03G 15/6502 399/400 |
| 2008/0247793 A1 * | 10/2008 | Sato | ........................ | G03G 21/20 399/388 |
| 2010/0061757 A1 * | 3/2010 | Sato | ........................ | G03G 15/00 399/107 |
| 2012/0306145 A1 * | 12/2012 | Chen | ........................ | B65H 1/02 271/9.01 |

* cited by examiner

IMAGE FORMING APPARATUS INCLUDING A HOUSING USED AS PAPER OUTPUT TRAY

BACKGROUND

1. Field

The present disclosure relates to image forming apparatuses and, in particular for example, to an image forming apparatus including a housing in which an image forming section that forms an image on a sheet of paper is contained and a paper output section, provided in the housing, into which the sheet of paper on which the image has been formed is ejected.

2. Description of the Related Art

An example of a conventional image forming apparatus is disclosed in Japanese Unexamined Patent Application Publication No. 2008-133112. The image forming apparatus of Japanese Unexamined Patent Application Publication No. 2008-133112 includes a housing having a printer housing section and a scanner housing section disposed on the printer housing section and a paper output tray, provided in an upper part of a front face side of the printer housing section, onto which a sheet of paper (recording paper) on which an image has been formed is ejected. This paper output tray is constituted by a fixed tray section that forms a part of an upper surface of the scanner housing section and a drawer tray section that is able to be accommodated in the scanner housing section and is located in front of the fixed tray section in a state of having been drawn from inside the scanner housing section.

In the technology of Japanese Unexamined Patent Application Publication No. 2008-133112, when the image forming apparatus is in use, the drawer tray section is in a state of having been drawn from the scanner housing section, and a sheet of paper is substantially horizontally ejected onto an upper surface of the drawer tray section. However, in a state where the drawer tray section has been drawn from the scanner housing section, a front face side of the housing opens wide sideways and the drawer tray section greatly sticks out in the direction that the front face side of the housing is facing. For this reason, there is a risk that a person passing in front of the image forming apparatus may come into accidental contact with the drawer tray section or a sheet of paper, and there is also a risk that sheets of paper loaded on the Paper output tray may be spread out by the effects of wind. This raises the need for further improvement in convenience. Further, in the technology of Japanese Unexamined Patent Application Publication No. 2008-133112, the wide opening of the housing and the great sticking out of a projection outward from the housing undesirably spoil aesthetic appearance.

SUMMARY

It is desirable to provide a novel image forming apparatus.

It is also desirable to provide an image forming apparatus that excels in convenience and aesthetic appearance.

According to an aspect of the disclosure, there is provided an image forming apparatus including: a housing in which an image forming section that forms an image on a sheet of paper is contained; and a paper output section, provided in the housing, into which the sheet of paper on which the image has been formed is ejected, wherein the paper output section includes a paper output tray that supports a front side or back side of the sheet of paper ejected into the paper output section and a paper takeout slot through which the sheet of paper is taken out, the housing has an external wall whose inner face side is used as the paper output tray, and the paper takeout slot opens upward.

DESCRIPTION OF THE EMBODIMENTS

First Embodiment

Figure 1:
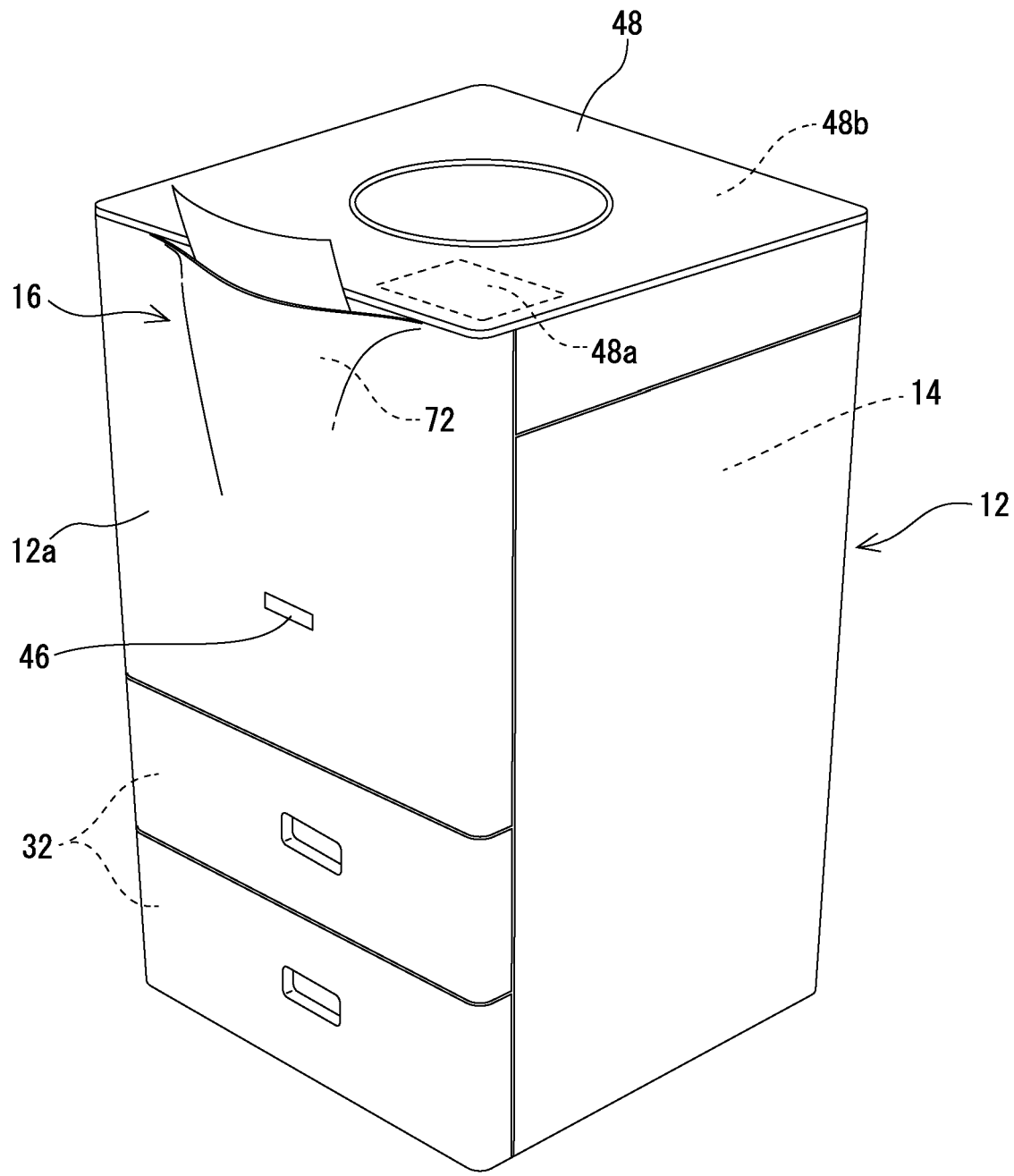
FIG. 1 is a schematic view showing the appearance of an image forming apparatus according to a first embodiment of the present disclosure.

Referring to FIG. 1, an image forming apparatus 10 according to a first embodiment of the present disclosure forms a multicolor or monochromatic image on a sheet of paper (recording medium) electrophotographically and ejects, into a paper output section 16, the sheet of paper on which the image has been formed. In this first embodiment, the image forming apparatus 10 is a multifunctional printer (MFP: multifunction peripheral) having a copy function, a printer function, a scanner function, a facsimile function, and other functions.

Figure 2:
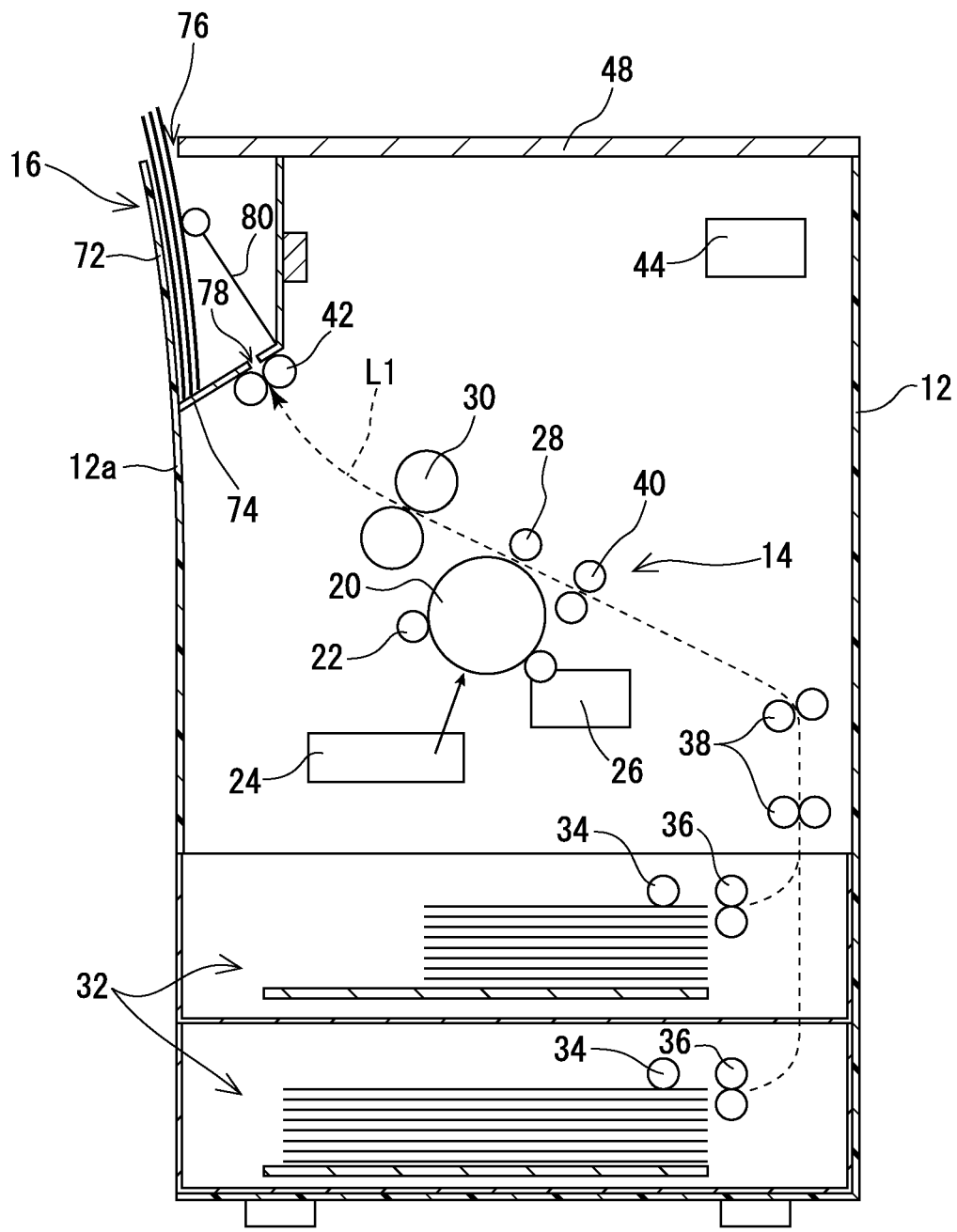
FIG. 2 is a schematic view schematically showing an internal structure of the imaging forming apparatus of FIG. 1.

First, a basic configuration of the image forming apparatus 10 is briefly described. As shown in FIGS. 1 and 2, the image forming apparatus 10 includes a cuboidal syntheticresin housing 12 containing an image forming section 14 and other components and, as will be described in detail later, includes, in an upper part of a front face side of the interior of the housing 12, a paper output section 16 having a paper takeout slot 76 opening upward.

The image forming section 14 includes components such as a photosensitive drum 20, a charging roller 22, a writing unit 24, a developing unit 26, a transfer roller 28, and a fixing unit 30. The image forming section 14 forms an image on a sheet of paper conveyed from a paper feed section 82 and other components provided in a lower part of the housing 12 and ejects, into the paper output section 16, the sheet of paper on which the image has been formed. It should be noted that examples of image data that is utilized to form an image on a sheet of paper includes image data read by the after-mentioned image reading section (display panel 48) and image data transmitted from an external computer.

The photosensitive drum 20 is an image carrier including a conductive cylindrical substrate and a photosensitive layer formed on a surface of the substrate. The charging roller 22 is a member that charges a surface of the photosensitive drum 20 to a predetermined potential. Further, the writing unit 24 is constructed as a laser scanning unit (LSU) including a laser emission section, a reflecting mirror, and other components and, by exposing the surface thus charged of the photosensitive drum 20, forms an electrostatic latent image corresponding to image data on the surface of the photosensitive drum 20. The developing unit 26 renders the electrostatic latent image formed on the surface of the photosensitive drum 20 visible with toner.

The transfer roller 28 is provided so that a nip section is formed between the photosensitive drum 20 and the transfer roller 28. When an image is formed, a predetermined voltage is applied to the transfer roller 28, whereby a transfer field is formed in the transfer nip section. Then, the action of this transfer field causes the toner image formed on the surface of the photosensitive drum 20 to be transferred onto a sheet of paper while the sheet of paper is passing through the transfer nip section.

The fixing unit 30 includes a heat roller, a pressure roller, and other components and is disposed on a downstream side of the transfer roller 28 in a paper conveying direction. The heat roller is set at a predetermined fixing temperature, and passage of the sheet of paper through a fixing nip section between the heat roller and the pressure roller causes the toner image transferred onto the sheet of paper to be fused, mixed, and pressed to be thermally fixed to the sheet of paper.

Further, the housing 12 contains a paper conveying path L1 through which a sheet of paper sent out from the paper feed section 32 by a pickup roller 34 and a paper feed roller 36 is sent to the paper output section 16 via the transfer nip section and the fixing nip section. This paper conveying path L1 is provided as appropriate with a conveying roller 38 for supplementarily giving an impulse to a sheet of paper, a registration roller 40 for sending out a sheet of paper to the transfer nip section at a predetermined timing, a paper output roller 42 for ejecting, into the paper output section 16, a sheet of paper on which an image has been formed, and other components.

Further, the housing 12 contains a control section 44, provided in a predetermined place, which includes a CPU, a memory, and other components. The control sections 44 transmits control signals to each section of the image forming apparatus 10 according to an input operation and other operations performed on an operation section 48a provided in the after-mentioned display panel 48 and thereby causes the image forming apparatus 10 to execute various actions.

Further, the housing 12 has a front wall 12a on which a human detection sensor 46 is provided. The human detection sensor 46 is a distance sensor for detecting a person who is present in a predetermined range that is in front of the image forming apparatus 10. Usable examples of the human detection sensor 46 include an infrared sensor, an ultrasonic sensor, and a laser distance sensor, and other similar sensors. In this first embodiment, the control section 44 detects, on the basis of distance data detected by the human detection sensor 46, whether a person is present in the predetermined range that is in front of the image forming apparatus 10. However, another usable example of the human detection sensor 46 is a camera (image sensor). In this case, it is possible to take an image with camera of the predetermined range that is in front of the image forming apparatus 10 and detect the presence or absence of a person in the image thus taken.

Furthermore, the display panel 48 is provided on top of the housing 12. The display panel 48 has a substantially rectangular plate shape and constitutes an upper wall of the housing 12. In this first embodiment, the display panel 48 is a sensor-equipped liquid crystal panel having optical sensors embedded in each separate pixel of a liquid crystal panel and, in addition to an image display function of displaying an image, has an image reading function of reading an image and a touch detection function of detecting a position to which a user has pointed. For example, an area on the display panel 48 located on the right near side is used as the operation section 48a, and an area on the display panel 48 excluding the operation section 48a is used as the image reading section 48b.

For a specific configuration of the display panel 48 having the image reading function and the touch detection function, refer to Japanese Unexamined Patent Application Publication No. 2010-62940 filed by the applicant of the present disclosure. Use of such a display panel 48 slims down the apparatus to bring about improvement in convenience and aesthetic appearance of the image forming apparatus 10. Note, however, that the specific configuration of the display panel 48 may be appropriately changed.

Figure 3:
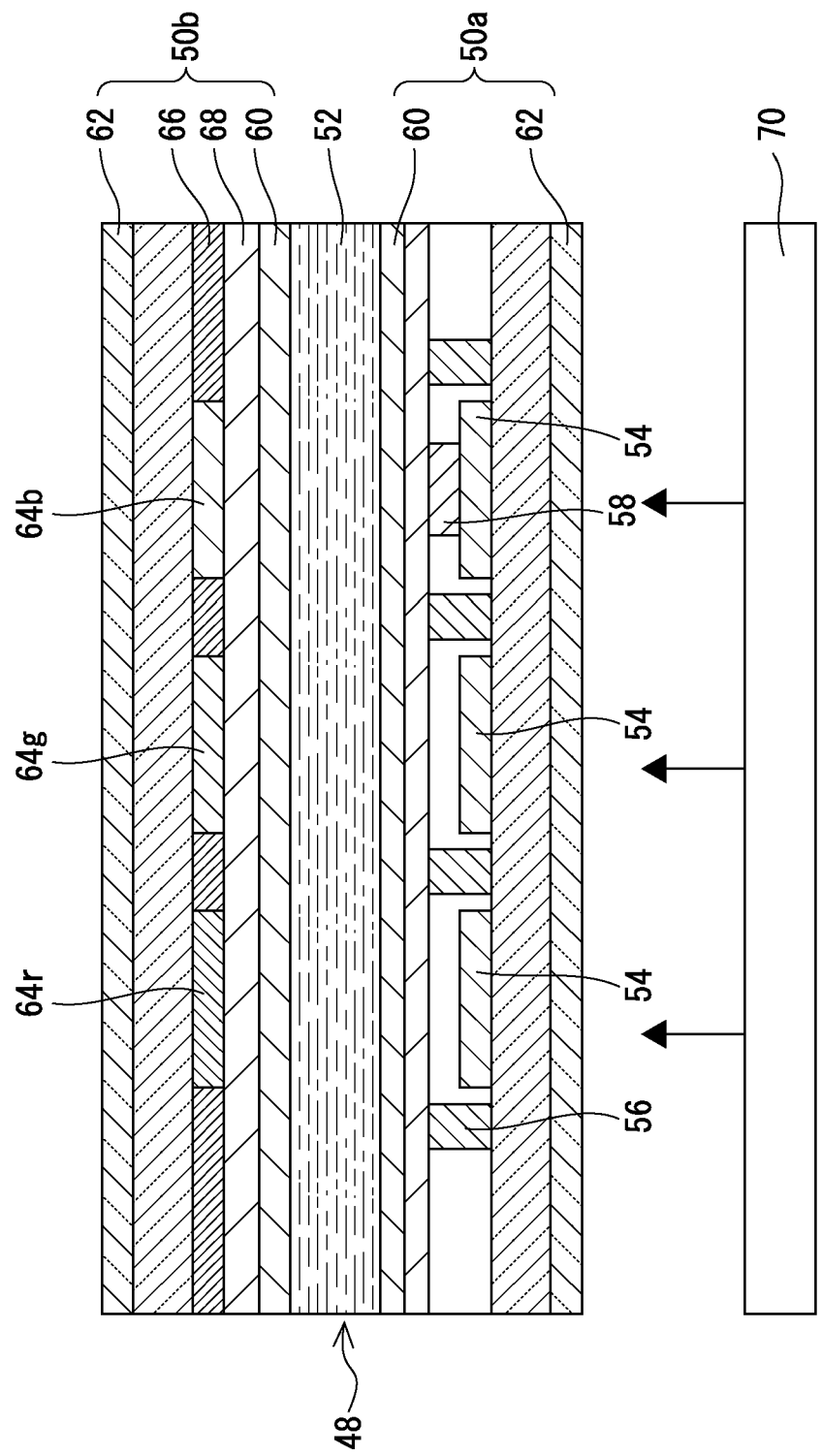
FIG. 3 is a schematic view schematically showing a cross-section structure of a display panel of the imaging forming apparatus of FIG. 1.

Simply put with reference to FIG. 3, the display panel 48 includes an active matrix substrate 50a disposed at the back, a counter substrate 50b disposed at the front, and a liquid crystal layer 52 sandwiched between the active matrix substrate 50a and the counter substrate 50b. The active matrix substrate 50a includes pixel electrodes 54, data signal lines 56, an optical sensor circuit (not illustrated) including an optical sensor 58, an alignment film 60, a polarizing plate 62, and other components. The counter substrate 50b includes color filters 64r (red), 64g (green), and 64b (blue), a light-shielding film 66, a counter electrode 68, an alignment film 60, a polarizing plate 62, and other components. Further, a backlight 70 is provided at the back of the display panel 48.

In such a display panel 48, a document placed on the polarizing plate 62 of the active matrix substrate 50a is irradiated with light from the backlight 70. The light from the backlight 70 is reflected by the document placed on the polarizing plate 62, and this reflected light passes through the color filters 64r, 64g, and 64b and is detected by the optical sensor 58, whereby an image on the document is read. Further, a position on the polarizing plate 62 to which the user has pointed with a fingertip or the like can be detected by detecting an reflected image from the backlight 70 with the optical sensor 58 or detecting an image with the optical sensor 58.

Figure 4:
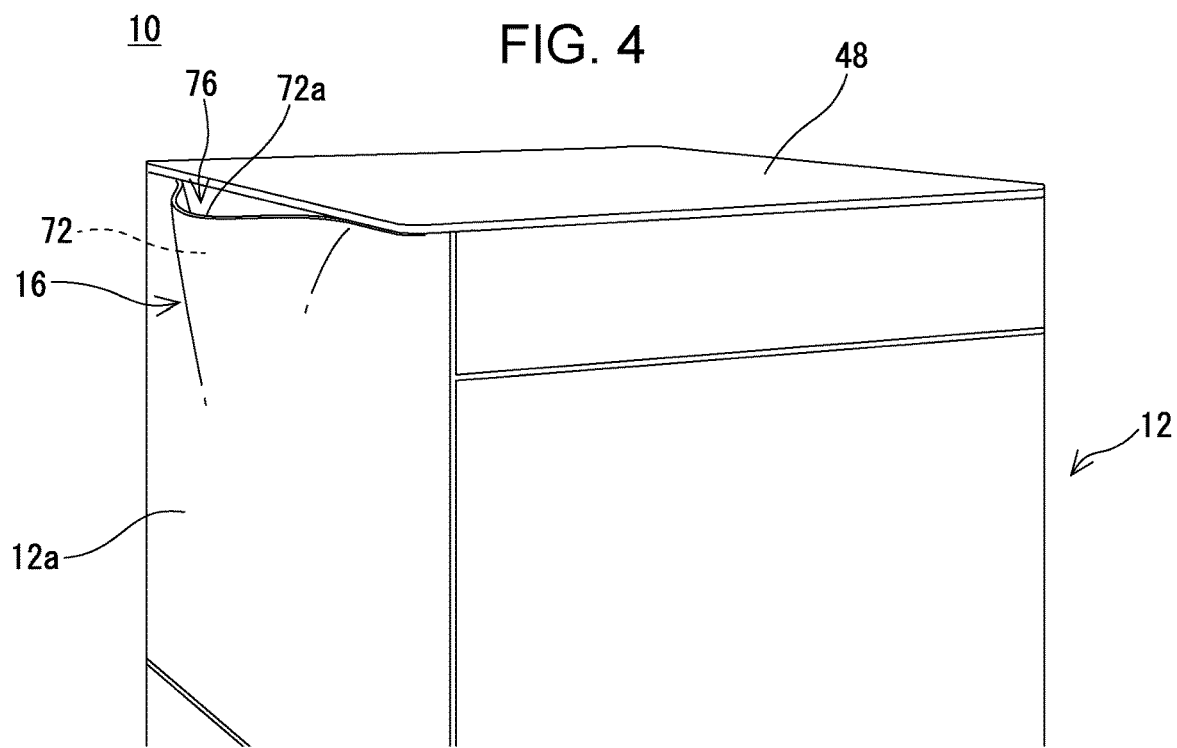
FIG. 4 is a perspective view showing an upper surface of, an upper front part of, and an upper right part of the imaging forming apparatus of FIG. 1.
Figure 5:
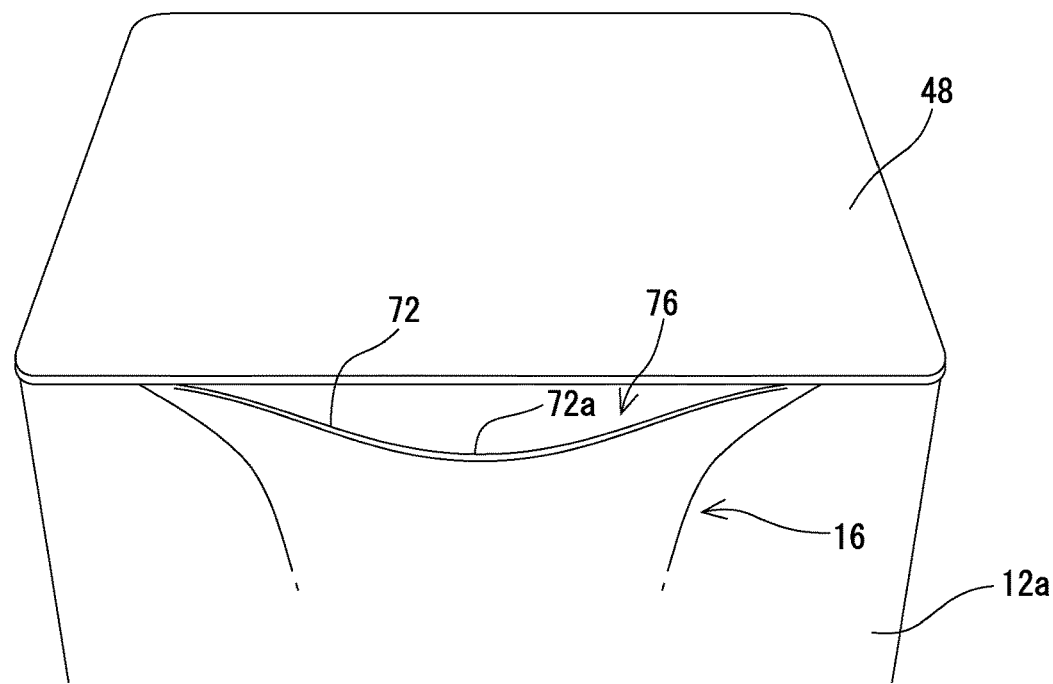
FIG. 5 is a perspective view showing the upper surface and upper front part of the imaging forming apparatus of FIG. 1.
Figure 6:
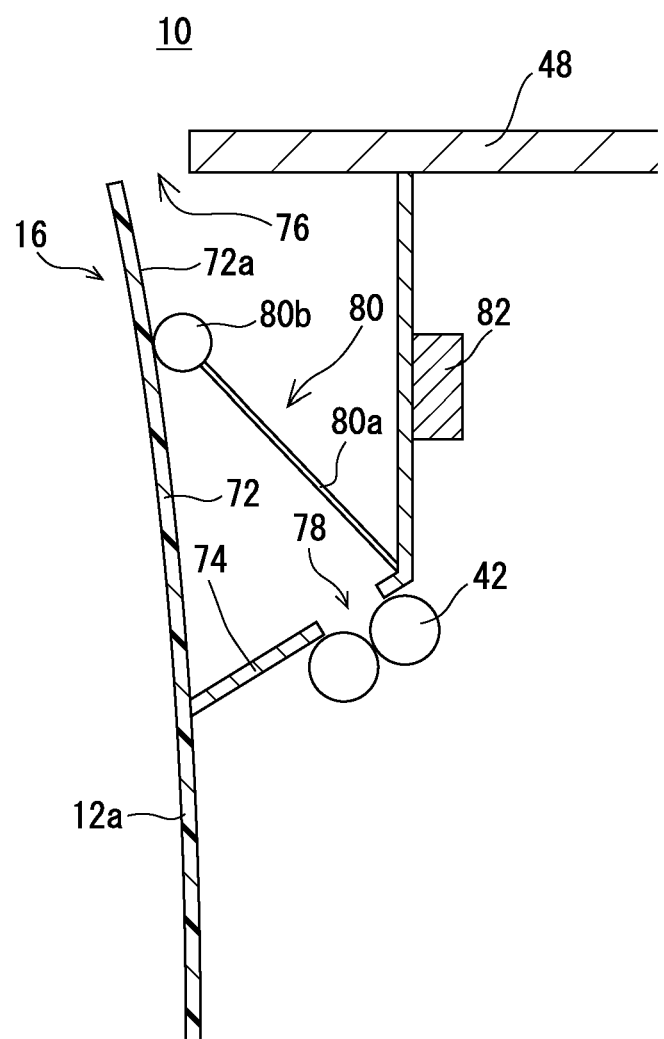
FIG. 6 is a schematic cross-sectional view showing a paper output section of the imaging forming apparatus of FIG. 1.
Figure 7:
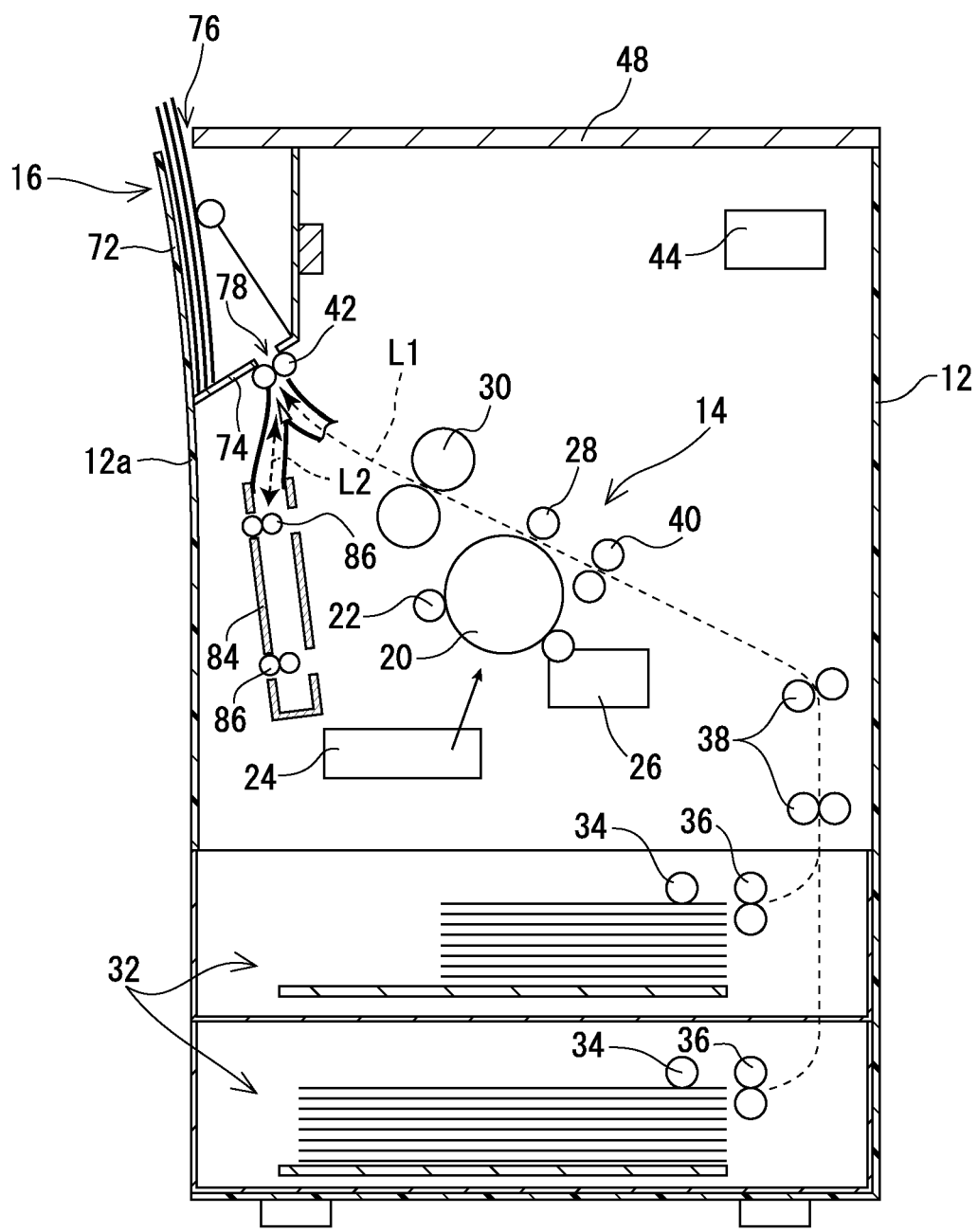
FIG. 7 is a schematic view schematically showing air internal structure of an imaging forming apparatus according to a second embodiment of the present disclosure.

Next, a configuration of the paper output section 16 is described. As shown in FIGS. 4 to 6, the paper output section 16 has a paper output space into which a sheet of paper on which an image has been formed by the image forming section 14 is ejected (accommodated), is disposed in portrait orientation at the outer edge of the interior of the housing 12, and opens upward. In this first embodiment, the paper output section 16 is disposed in the upper part of the front face side of the interior of the housing 12.

Specifically, the paper output section 16 includes a paper output tray 72 that supports the front side or back side of a sheet of paper on which an image has been formed and which has been ejected into the paper output section 16, a back-end supporting member 74 that supports a back end of the sheet of paper in a paper ejection direction, and the paper takeout slot 76, through which the sheet of paper is taken out of the paper output section 16.

Moreover, in this first embodiment, an inner face side of the front wall 12a of the housing 12 is used as the paper output tray 72. That is, the paper output tray 72, formed integrally with the front wall 12a, may be provided so as to extend in a substantially vertical direction, and the paper output section 16 has its front surface side covered with the front wall 12a functioning as the paper output tray 72. Further, the back-end supporting member 74 is provided at a tilt so as to have a falling gradient toward the paper output tray 72. Formed at an end of this back-end supporting member 74 opposite to the paper output tray 72 is a paper output slot 78 through which a sheet of paper on which an image has been formed is ejected into the paper output section 16. The aforementioned paper output roller 42 is provided underneath this paper output slot 78. Moreover, the paper takeout slot 76 is formed in an upper part of the paper output space of the paper output section 16 and opens upward.

That is, in this first embodiment, a sheet of Paper on which an image has been formed is ejected upward in a substantially vertical direction into the paper output section 16 (i.e. placed in portrait orientation) and picked upward by the user through the paper takeout slot 76 (see FIGS. 1 and 2).

It should be noted that the term "upward in a substantially vertical direction (substantially vertical direction)" as used herein means a state of having an angle of 75 degrees or greater with respect to a horizontal plane and encompasses an angular range of ±15 degrees with respect to a vertical plane.

Further, the length of the paper output tray 72 in the paper ejection direction, i.e. the distance between the back-end supporting member 74 and the paper takeout slot 76, may be set to be smaller than the length of a sheet of paper of a predetermined size in the paper ejection direction. This is intended to cause a leading end of a sheet of paper of a predetermined size elected into the paper output section 16 to stick out of the Paper takeout slot 76. For example, the length of the paper output tray 72 in the paper ejection direction is set with reference to A4 paper, which is most frequently used in the image forming apparatus 10, and is set so that a leading end of an A4 sheet of paper sticks out of the paper takeout slot 76 for example by 2 to 5 cm. Note, however, that any size of paper may be used as a standard. This enables the user to easily take hold of and remove a sheet of paper from the paper output section 16, This is effective especially in taking out plural sheets of paper at once. Further, even when a leading end of a sheet of paper sticks out of the paper takeout slot 76, the leading end of the sheet of paper only sticks out toward a higher position than the image forming apparatus 10; therefore, the leading end of the sheet of paper does not come in the way of a person passing in front of the image forming apparatus 10.

Further, the paper output tray 72 is in the shape of a curved plate whose central part is recessed further outward than both ends, and the paper output tray 72 may be provided with a depression 72a extending along the paper ejection direction. The aforementioned paper takeout slot 76 has its opening edge constituted by an upper end of the depression 72a and a front end of the display panel 48. In this case, it is preferable that the depression 72a be formed so that its width becomes gradually greater upward (i.e. toward the paper takeout slot 76) and its depth becomes gradually greater upward. Thus, by having the depression 72a, the paper output tray 72 allows a sheet of paper elected into the paper output section 16 to be curved widthwise along the depression 72a, thus preventing the sheet of paper from hanging on to the front face side or back face side. Further, by having the depression 72a, the paper output tray 72 allows plural sheets of paper that are ejected into the paper output section 16 to be appropriately aligned in a widthwise central part of the paper output section 16.

Further, although not illustrated, a plurality of ribbed conveying guides placed at predetermined intervals widthwise and extending along the paper ejection direction may be provided on a paper loading surface of the paper output tray 72 (i.e. an inner surface of the front wall 12a).

Furthermore, the paper output section 16 may be provided with a paper holding section 80 that holds a sheet of paper onto the paper output tray 72. The paper holding section 80 includes a supporting member 80a provided so as to be rotatable on a lower back end or the like of the paper output section 16 and a roller member 80b provided so as to be rotatable with respect to a distal end of the supporting member 80a The paper holding section 80 holds a sheet of paper under its own weight. Note, however, that the paper holding section 80 may press a sheet of paper with an elastic body such as a spring instead of or together with its own weight. A sheet of paper ejected into the paper output section 16 is appropriately moved to the paper output tray 72 by the tilt of the back-end supporting member 74 and the pressing force of the paper holding section 80.

Further, the paper output section 16 is provided with a light source 82 such as an LED. The control section 44 causes the light source 82 to glow blue, for example, in time with the start of formation of an image on a sheet of paper or in time with the ejection of a sheet of paper into the paper output section 16. Further, for example, in a case where a paper jam occurs, the control section 44 causes the light source 82 to glow red. By thus causing the light source 82 to glow at a predetermined timing to illuminate the interior of the paper output section 16, the user is allowed to know the timing of paper ejection, the occurrence of a paper jam, and the like.

As noted above, in this first embodiment, the inner face side of the front wall 12a of the housing 12 is used as the paper output tray 72 and the paper takeout slot 76 opens upward. Therefore, the paper output section 16 and a sheet of paper on which an image has been formed do not stick out toward a position that is in front of the housing 12 or, even if they do, only stick out at a slight height. This prevents a person passing in front of the image forming apparatus 10 from coming into accidental contact with the paper output section 16 or a sheet of paper on which an image has been formed. Further, since the front face side of the paper output section 16 is covered with the front wall 12a of the housing 12, sheets of paper loaded on the paper output tray 72 are prevented from being spread out by the effects of wind, so that the state of ejection of the sheets of paper is appropriately maintained. Therefore, the first embodiment brings about improvement in convenience of the image forming apparatus 10.

Further, according to this first embodiment, the provision of the paper output section 16 does not cause the housing 12 to greatly open or cause a projection to greatly stick out outward from the housing 12. This makes it possible to express an entirely simple, integrated, and sophisticated aesthetic appearance. This in turn brings about improvement in aesthetic appearance of the image forming apparatus 10.

Furthermore, according to this first embodiment, a sheet of paper on which an image has been formed is ejected upward in a substantially vertical direction into the paper output section 16 so that a leading end of the sheet of paper sticks out upward. This enables the user to easily take hold of and remove the sheet of paper from the paper output section 16 (e.g. quickly take out the sheet of paper).

It should be noted that although, in the aforementioned first embodiment, the inner face side of the front wall 12a is used as the paper output tray 72, an inner face side of another external wall, i.e. a right side wall, a left side wall, or a back wall, of the housing 12 may be used as the paper output tray 72. That is, the paper output section 16 may be disposed on any of the font face side, right face side, left face side, and back face side of the interior of the housing 12.

Further, although, in the aforementioned first embodiment, the front face side of the paper output section completely covered. With the paper output tray 72 the front wall 12a of the housing 12), it does not need to be completely covered. For example, the paper output tray 72 may be provided with a slit or a through-hole extending downward from an upper end of the paper output tray 72.

Furthermore, although, in the aforementioned first embodiment, the display panel 48, which constitutes the Upper wall of the housing 12, has the image reading function and a touch panel function to function not only as a display section but also as the image reading section 48b and the operation section 48a, the display panel 48 does not necessarily need to have the image reading function and/or the touch detection function. Further, the upper wall of the housing 12 needs only have at least one of the image display function, the image reading function, and the touch detection function, or may be a simple panel (cover) having none of these functions.

Further, although, in the aforementioned first embodiment, the back-end supporting member 74 of the paper output section 16 is provided in a fixed manner, the back-end supporting member 74 may be provided so as to be electrically or manually movable with respect to the paper ejection direction. For example, the control section 44 moves up and down the back-end Supporting member 74 depending on the size of a sheet of paper that is ejected into the paper output section 16, thereby making an adjustment so that a leading end of the sheet of paper sticks out of the paper takeout slot 76 by a predetermined length.

Second Embodiment

Next, an image forming apparatus 10 according to a second embodiment of the present disclosure is described with reference to FIGS. 7 to 10C. This second embodiment differs from the aforementioned first embodiment in that the second embodiment includes a stacking section 84. The other components of the second embodiment are identical to those of the aforementioned first embodiment. Those components of the second embodiment which are identical to those of the aforementioned first embodiment are given the same reference numerals, and a repeated description of those components is either omitted or simplified. As for the omission or the like of a repeated description, the same applies to the other embodiments described below.

In this second embodiment, the stacking section 84, in which a sheet of paper on which an image has been formed can temporarily accommodated before it is ejected into the paper output section 16, is provided below the paper output roller 42. The stacking section 84 is disposed in portrait orientation so as to be slightly tilted toward the front face side of the housing 12 and opens upward. This stacking section 64 is provided with one or more takeout rollers 86. This takeout roller 86 includes a driving roller 86a and a driven roller 86b, and the driven roller 86b is provided so as to be able to contact and separate from the driving roller 86a. That is, the driven roller 86b is displaceable between a pressing position where the driven roller 86b presses the driving roller 86a and an out-of-contact position where the driven roller 86b is out of contact with the driving roller 86a. A publicly-known contact and separation mechanism is appropriately adoptable as a mechanism for causing the driven roller 86b to contact and separate from the driving roller 86a.

Figure 8:
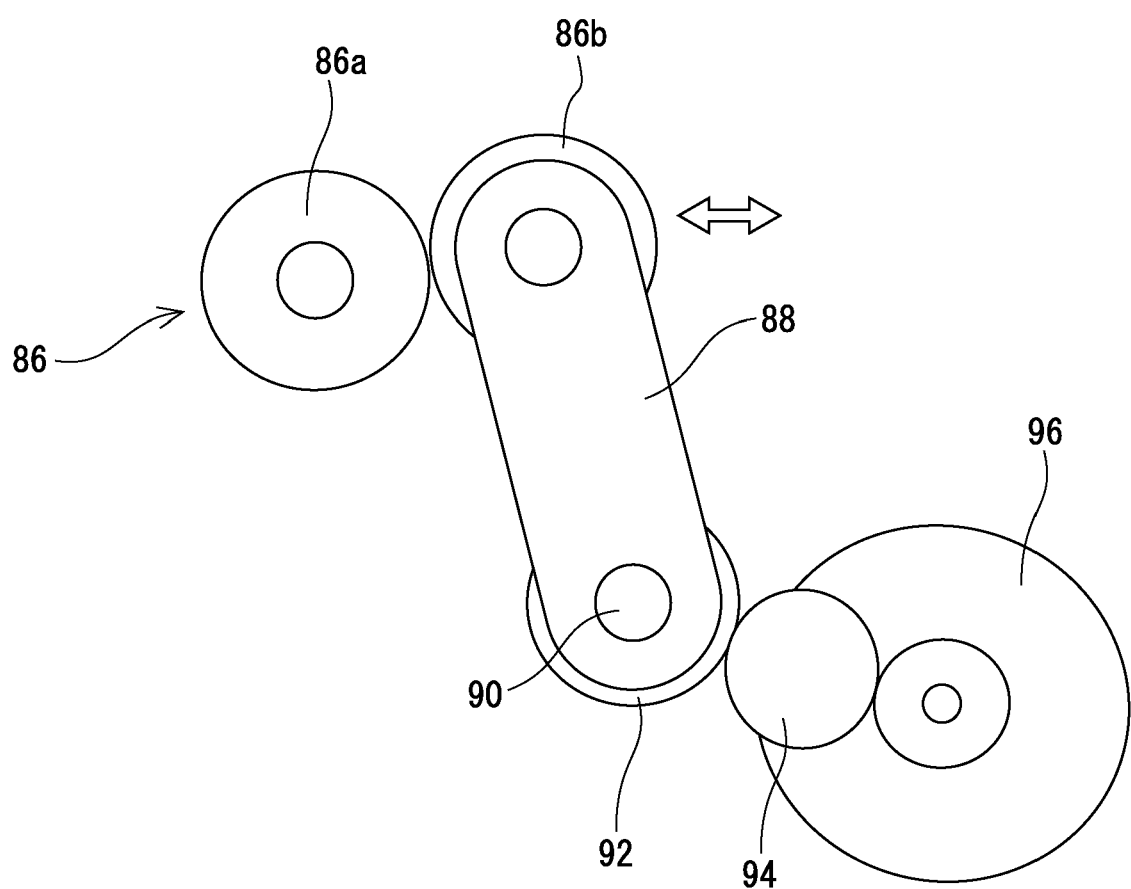
FIG. 8 is a schematic view schematically showing a contact and separation mechanism of a takeout roller of a stacking section of the imaging forming apparatus of FIG. 7.

FIG. 8 shows an example of a contact and separation mechanism that is adoptable into the takeout roller 86. Simply put, the driven roller 86b is pivotally supported at a first end of a roller holder 88, and this roller holder 88 is provided so as to be swingable on a rotating shaft 90 provided at a second end of the roller holder 88. Further, the rotating shaft 90 is provided with a gear 92, and a motor 96 is coupled to this gear 92 via another gear 94 or the like. Rotation of the gear 92 by the driving force of the motor 96 causes the roller holder 88 to swing on the rotating shaft 90, whereby the driven roller 86b is displaced in such directions as to contact and separate from the driving roller 86a. Further, although not illustrated, the roller holder 88 is provided with a biasing member such as a kick spring. This biasing member serves to apply a load to the driven roller 86b in a direction toward the driving roller 86a, and the action of this biasing member allows a sheet of paper to be nipped between the driving roller 86a and the driven roller 86b with a constant pressing force even in the case of a change in the number (thickness) of sheets of paper that are accommodated in the stacking section 84.

Further, although not illustrated, in this second embodiment, the paper output roller 42 is also provided with a contact and separation mechanism. That is, the paper output roller 42 includes a driving roller 42a and a driven roller 42b, and the driven roller 42b is able to contact and separate from the driving roller 42a As in the case of the takeout roller 86, a publicly-known contact and separation mechanism is appropriately adoptable as the contact and separation mechanism of the paper output roller 42.

Further, a guiding gate 98 for switching paper conveying directions is provided at the point where the paper conveying path L1 connecting the image forming section 14 to the paper output section 16 and a paper conveying path L2 connecting the stacking section 84 to the paper output section 16 meet. Furthermore paper detection sensors 110 are provided near the paper output slot 78 and near the inlet and outlet of the stacking section 84, respectively (see FIG.

10). Reflective optical sensors or similar sensors may be used as the paper detection sensors 110.

The following describes examples of actions of the image forming apparatus 10 according to the second embodiment through plural sheets of paper on which an image(s) has/have been formed are temporarily accommodated in the stacking section 84 and then ejected en bloc into the paper output section 16. Note, however, that in a case where a single sheet of paper is accommodated in the stacking section 84, the same actions are performed as in the case of plural sheets of paper, except that the first sheet of paper is also the last sheet of paper. Further, the user can select whether to temporarily accommodate a sheet of paper in the stacking section 84 or eject it directly into the paper output section 16.

Figure 9A:
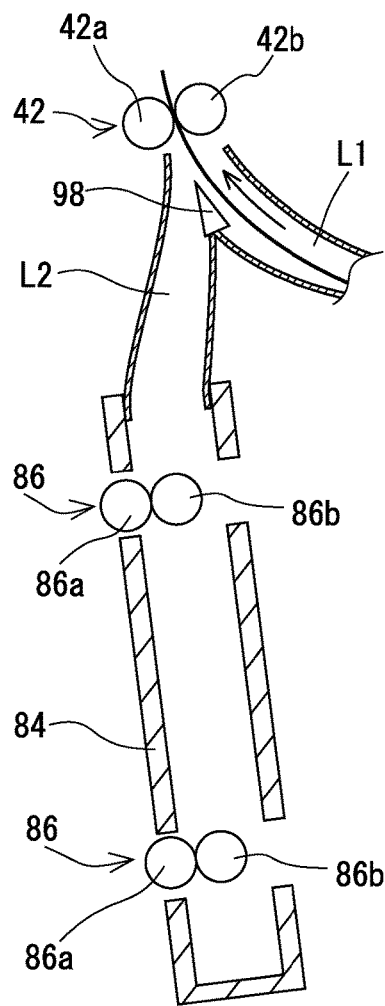
FIGS. 9A to 9C are schematic views for explaining paper ejection actions of the imaging forming apparatus of FIG. 7.
Figure 9B:
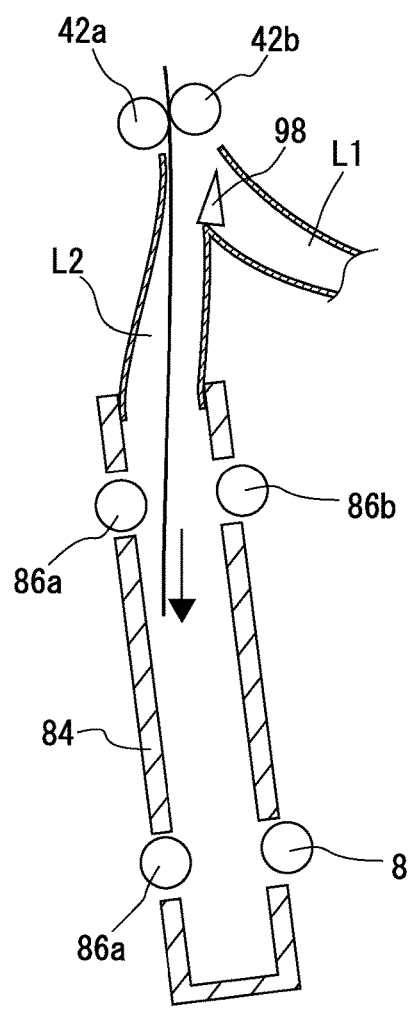
Figure 9C:
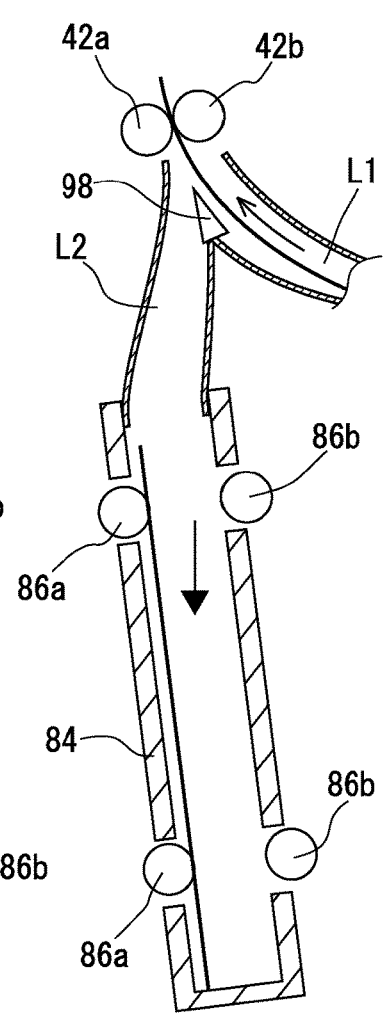

As shown in FIG. 9A, when a sheet of paper on which an image has been formed is conveyed through the paper conveying path L1, the guiding gate 98 is in a first state where the guiding gate 98 is tilted toward the paper conveying path L2. Further, the driven roller 86b of the takeout roller 86 is in the pressing position where the driven roller 86b presses the driving roller 86a. Next, as shown in FIG. 9B, when a back end of the sheet of paper has reached the paper output roller 42, the guiding gate 98 is switched to a second state where the guiding gate 98 is tilted toward the paper conveying path L1 and the paper output roller 42 starts to rotate in the reverse direction. Further, the driven roller 86b of the takeout roller 86 is displaced into the out-of-contact position where the driven roller 86b is out of contact with the driving roller 86a. This causes the sheet of paper to be guided into the stacking section 84. Since, as shown in FIG. 9C, the stacking section 84 is slightly tilted toward the front face side of the housing 12, the sheet of paper accommodated in the stacking section 84 is moved to the driving roller 86a and aligned along the tilt of the stacking section 84. Then, when the next sheet of paper is conveyed through the paper conveying path L1, the guiding gate 98 is switched to the first position and the same actions as above are repeated, so that sheets of paper are accommodated in sequence in the stacking section 84.

Figure 10A:
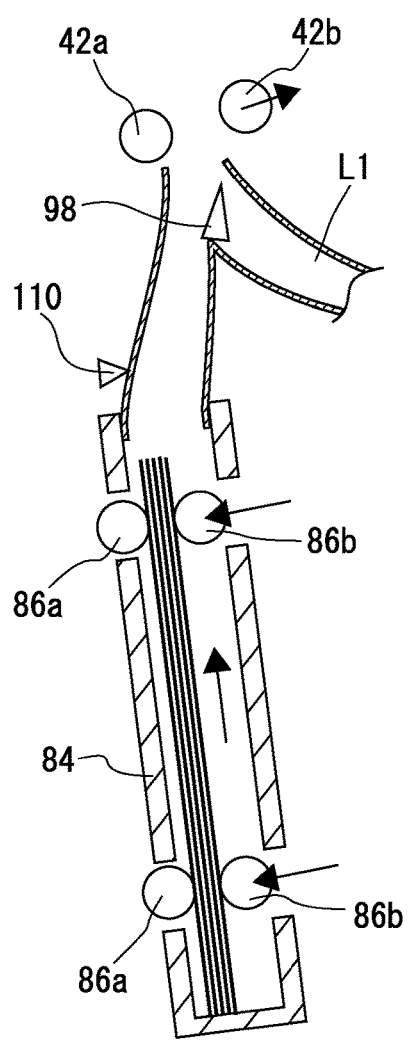
FIGS. 10A to 10C are schematic views for explaining paper ejection actions that follow those of FIGS. 9A to 9B.
Figure 10B:
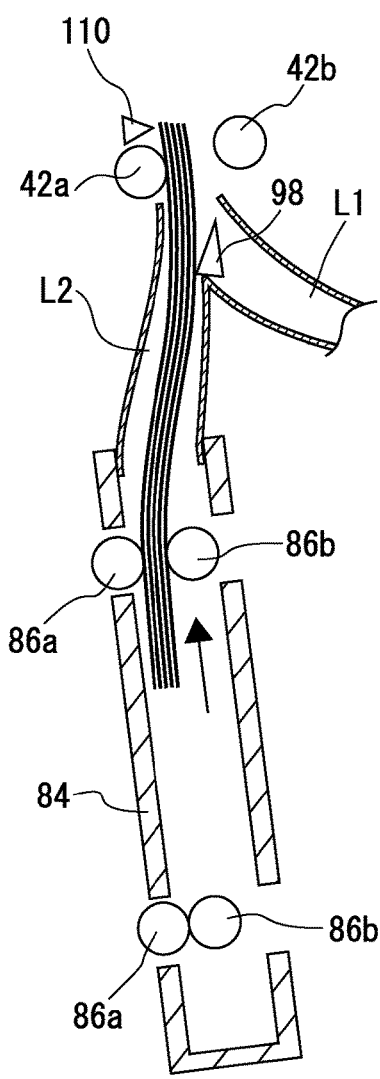
Figure 10C:
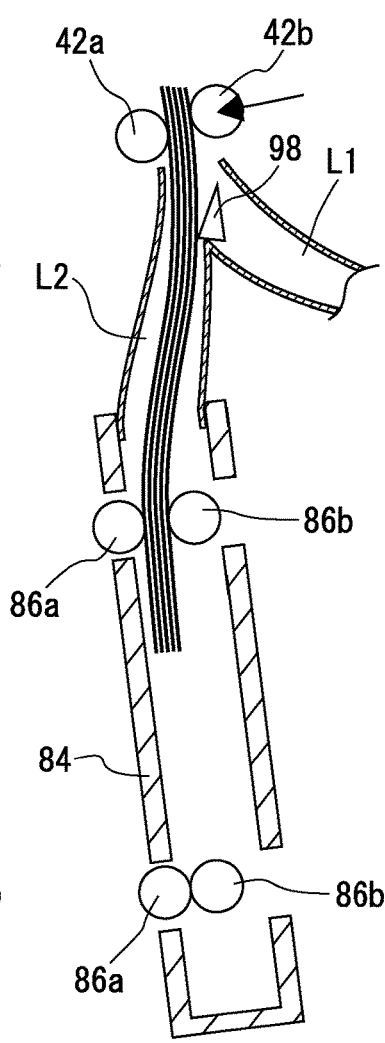

Upon detection of accommodation in the stacking section 84 of the number of sheets of paper as designated by a print request, the sheets of paper are sent out from the stacking section 84 and ejected into the paper output section 16. Specifically, as shown in FIG. 10A, a predetermined period of time after detection of a back end of the last sheet of paper by the paper detection sensor 110 provided near the inlet and outlet of the stacking section 84, the driven roller 86b of the takeout roller 86 is displaced into the pressing position. This causes the sheets of paper to be nipped between the driving roller 86a and the driven roller 86b of the takeout roller 86. Further, at this point in time, the driven roller 42b of the paper output roller 42 is displaced into an out-of-contact position where the driven roller 42b is out of contact with the driving roller 42a. Next, as shown in FIG. 10B, the driving roller 86a of the takeout roller 86 gets driven, so that the sheets of paper are conveyed toward the paper output section 16. Then, upon detection of leading ends of the sheets of paper by the paper detection sensor 110 provided near the paper output slot 78, the driven roller 42b of the paper output roller 42 is displaced into a pressing position as shown in FIG. 10C. After that, the driving roller 42a of the paper output roller 42 gets driven, whereby the plural sheets of paper are ejected en bloc into the paper output section 16.

Note, however, that the timing of ejection into the paper output section 16 of sheets of paper accommodated in the stacking section 84 can be arbitrarily set. For example, the sheets of paper can be ejected into the paper output section 16 soon after detection of accommodation of the last sheet of paper in the stacking section 84, or the sheets of paper can be ejected into the paper output section 16 in time with the coming of a user who picks the sheets of paper.

The second embodiment brings about the same working effects as the first embodiment to improve the convenience and aesthetic appearance of the image forming apparatus 10. Further, the image forming apparatus 10 has further improved convenience in term of being able to eject plural sheets of paper en bloc into the paper output section 16 at any timing.

Third Embodiment

Figure 11:
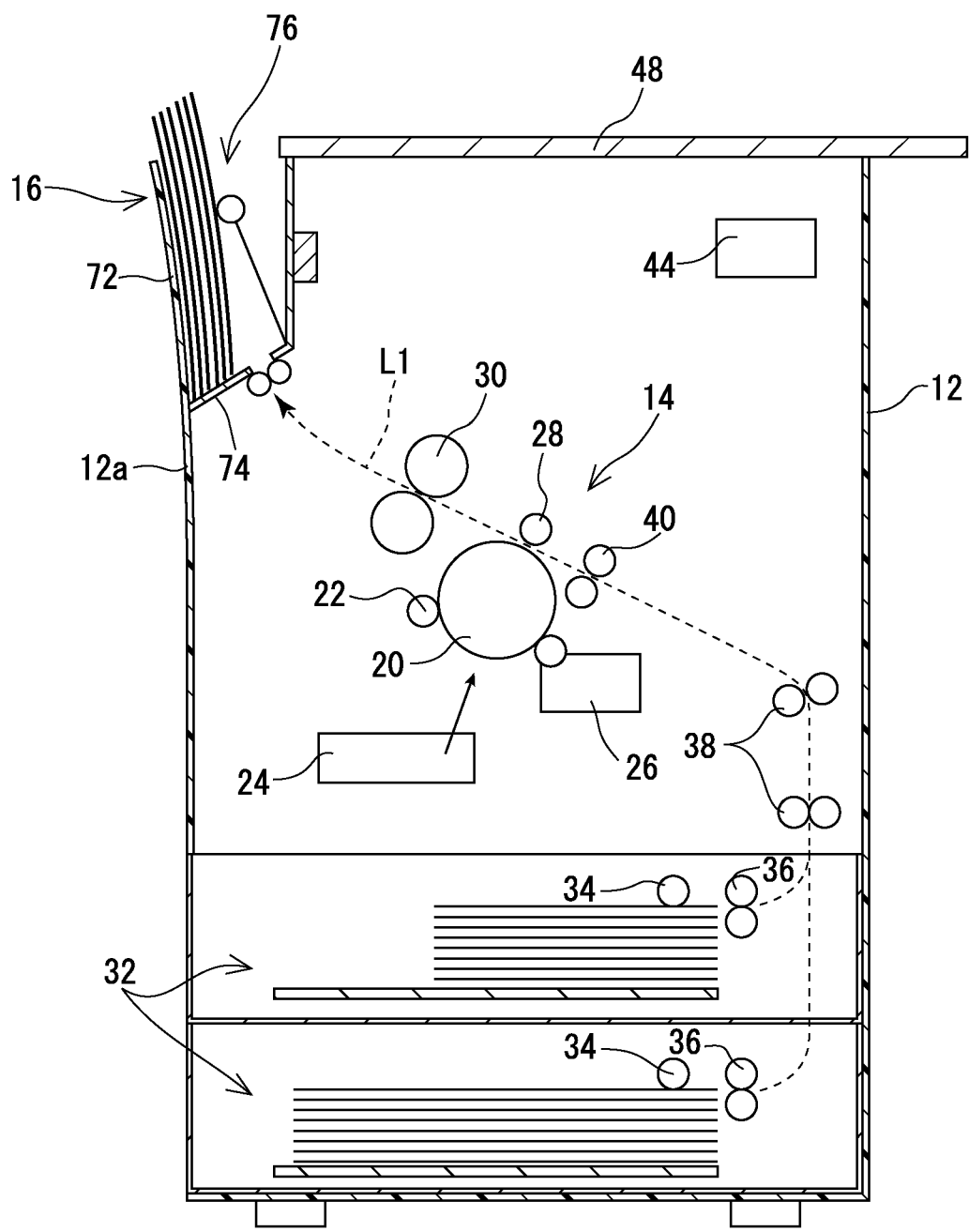
FIG. 11 is a schematic view schematically, showing an internal structure of an imaging forming apparatus according to a third embodiment of the present disclosure.
Figure 12A:
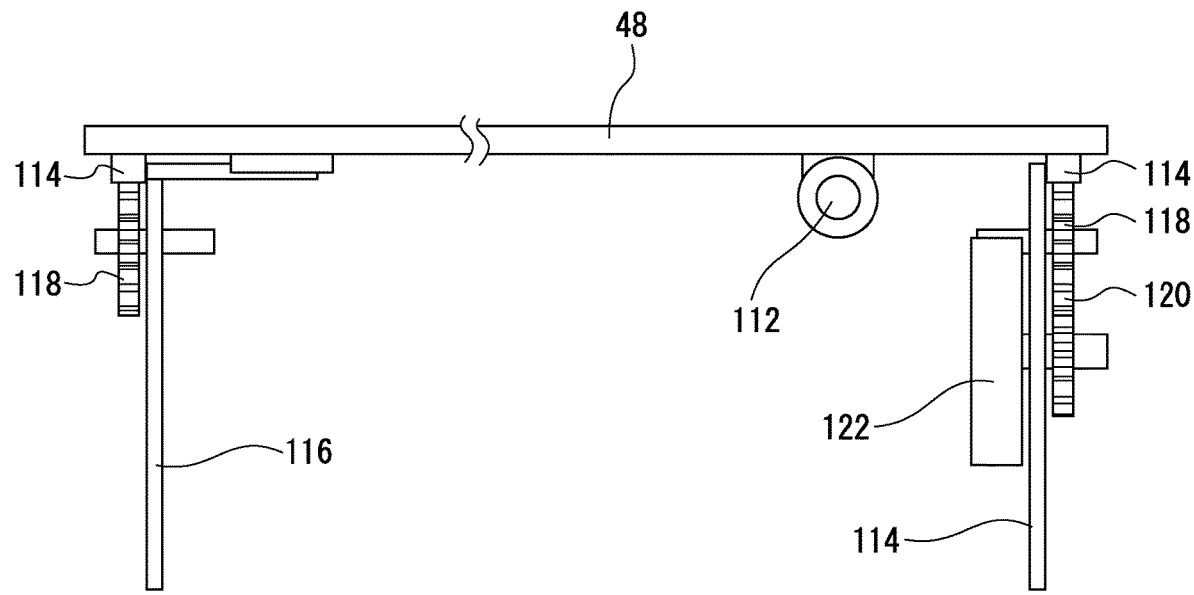
FIGS. 12A and 12B are schematic views schematically showing a movement mechanism of a display panel of the imaging forming apparatus of FIG. 11.
Figure 12B:
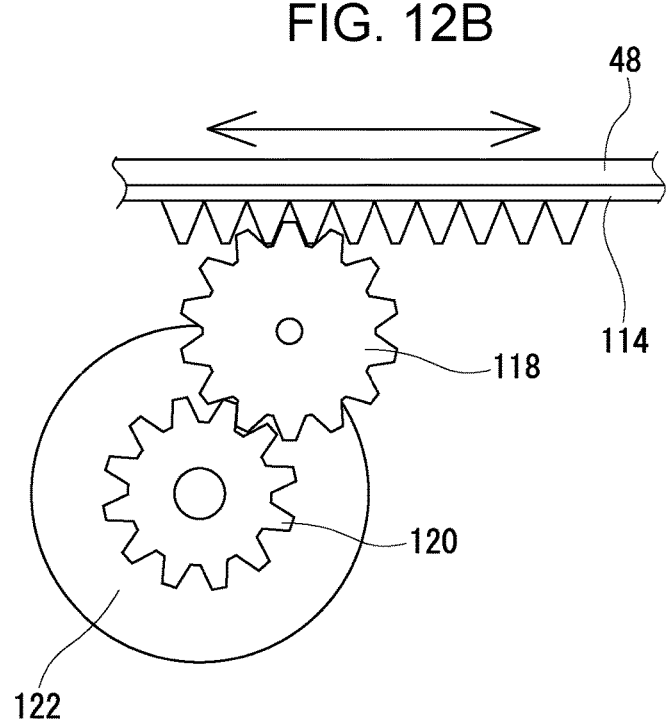

Next, an image forming apparatus 10 according to a third embodiment of the present disclosure is described with reference to FIGS. 11 to 12B. The third embodiment differs from the aforementioned first embodiment in that the display panel 48 is movable.

In this third embodiment, the display panel 48, which constitutes the upper wall of the housing 12, is provided so as to be movable in such directions as to contact and separate from the paper output tray 72 (in this third embodiment, in front-back directions toward the front and back of the image forming apparatus 10). A usable example of a movement mechanism of the display Panel 48 is a rack-and-pinion mechanism. Simply put, the display panel 48 is provided so as to be slidable along a shaft 112 extending in the front-back directions. Racks 114 extending in the front-back directions are fixed to the right face side and left face side, respectively, of the back side of the display panel 48. A pinion gear 118 rotatably supported by a supporting frame 116 is coupled to each of the racks 114, and a motor 122 is coupled to a first one of the pinion gear 118 via a coupling gear 120. Driving the motor 122 to rotate the first pinion gear 118 causes the racks 114 to move in the front-back directions, and this movement of the racks 114 entails moving the display panel 48 in the front-back directions.

The control section 44 moves the di splay panel 48 in the front-back directions according to the number of sheets of paper that are ejected into the paper output section 16, thereby adjusting the opening area of the paper takeout slot 76. For example, in a case where a large number of sheets of paper are ejected into the paper output section 16, the paper takeout slot 76 is widened by moving the display panel 48 in a direction toward the back, i.e. in a direction away from the paper output tray 72.

As with the first embodiment, the third embodiment brings about improvement in convenience and aesthetic appearance of the image forming apparatus 10. Further, the third embodiment can also appropriately deal with a case where a large number of sheets of paper are ejected into the paper output section 16.

Fourth Embodiment

Figure 13:
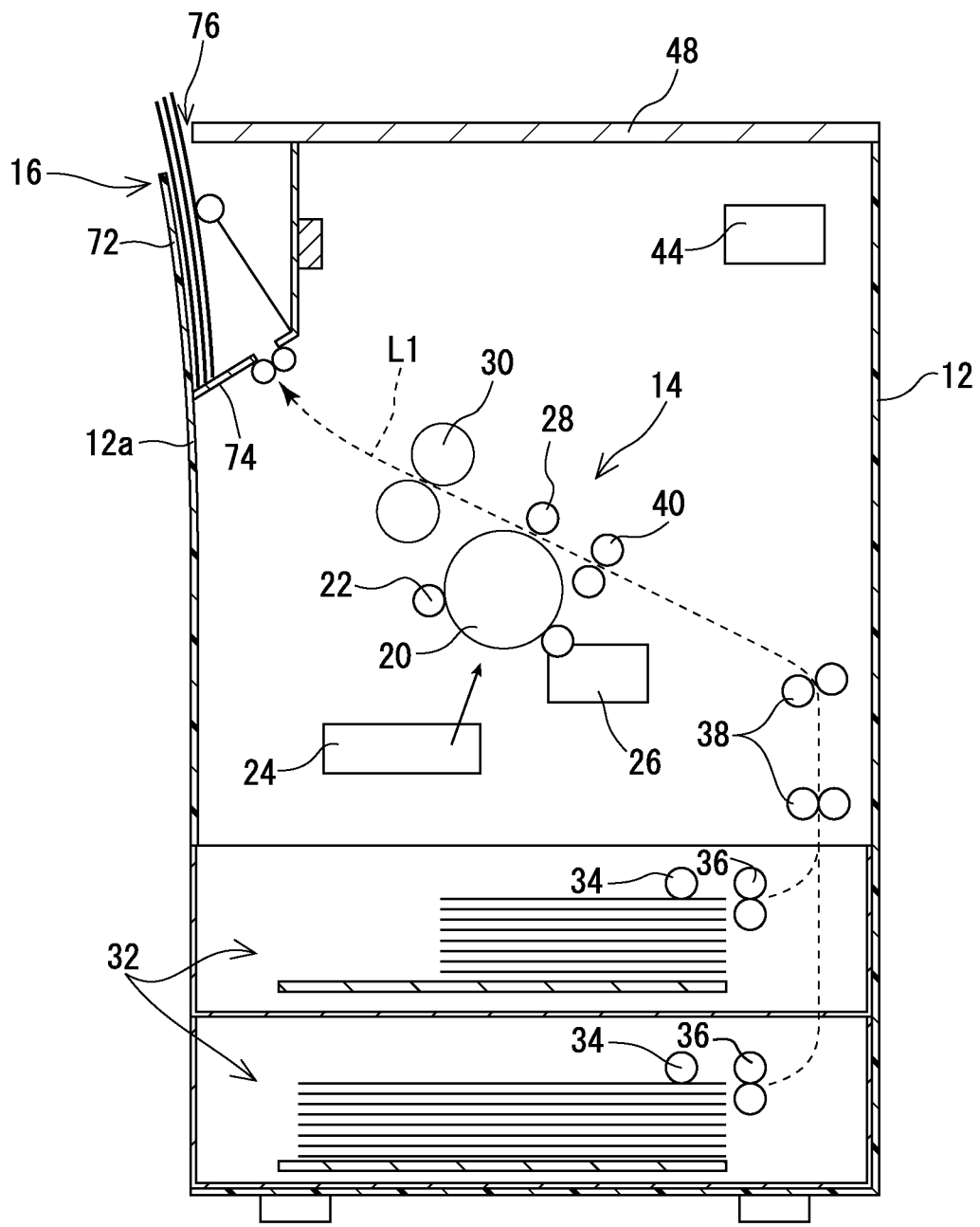
FIG. 13 is a schematic view schematically showing an internal structure of an imaging forming apparatus according to a fourth embodiment of the present disclosure.

Next, an image forming apparatus 10 according to a fourth embodiment of the present disclosure is described with reference to FIG. 13. This fourth embodiment differs from the aforementioned first embodiment in terms of how the paper output tray 72 is configured.

Simply put, in the aforementioned first embodiment, the paper output tray 72 is provided so that the upper end of the paper output tray 72 is at substantially the same level as (substantially flush with) an upper surface of the housing 12 (i.e. an upper surface of the display panel 48). On the other hand, in this fourth embodiment, the paper output tray 72 is provided so that the upper end of the paper output tray 72 is at a lower level than the upper surface of the housing 12 (for example by 2 to 5 cm). For example, the level of the upper end of the paper output tray 72 may be lowered by causing an external wall portion serving as the paper output tray 72 to be recessed further downward than other external wall portions.

As with the first embodiment, the fourth embodiment brings about improvement in convenience and aesthetic appearance of the image forming apparatus 10. Further, the fourth embodiment makes it easy to take out a sheet of paper obliquely upward.

Fifth Embodiment

Figure 14:
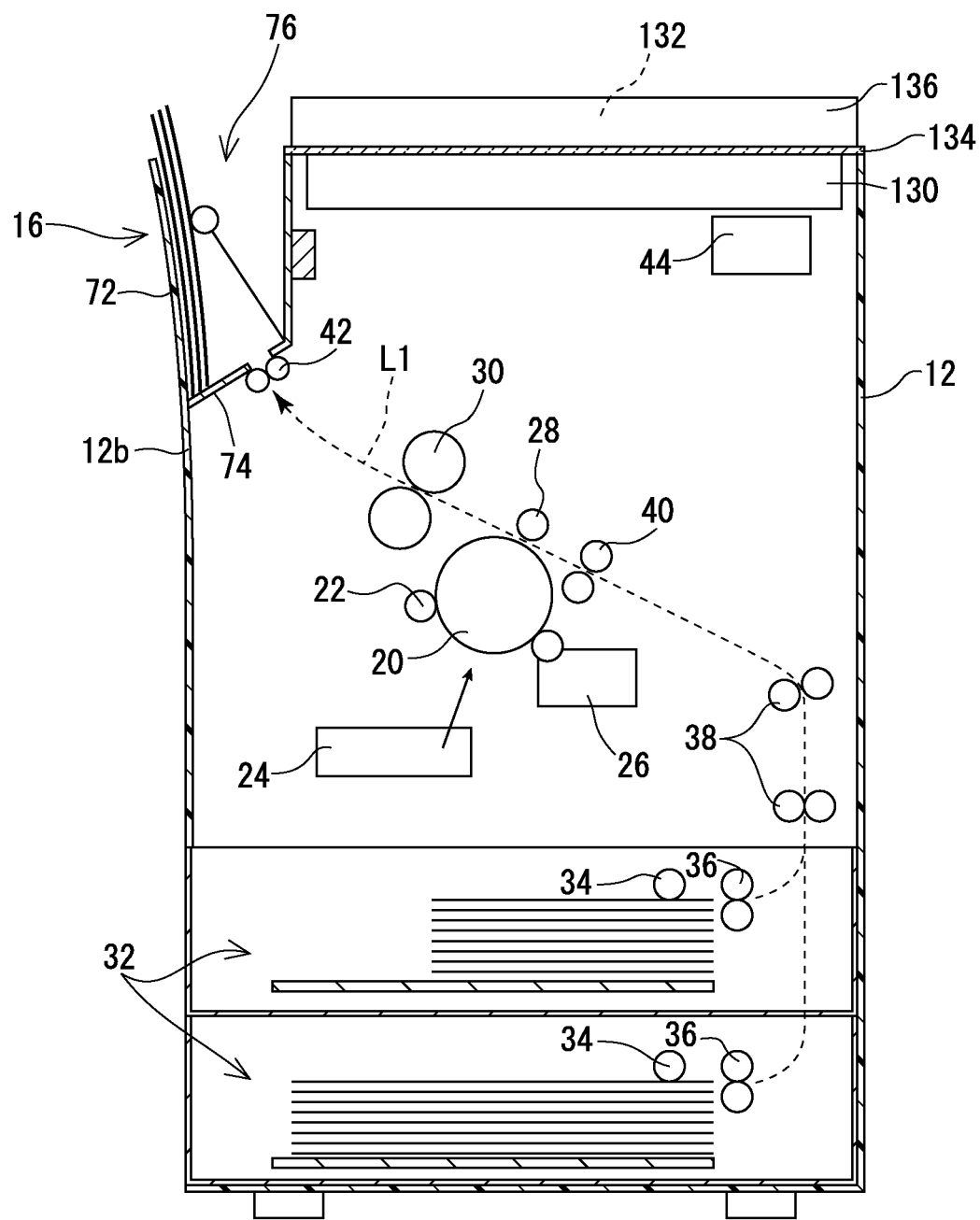
FIG. 14 is a schematic view schematically showing an internal structure of an imaging forming apparatus according to a fifth embodiment of the present disclosure.

Next, an image forming apparatus 10 according to a fifth embodiment of the present disclosure is described with reference to FIG. 14. This fourth embodiment differs from the aforementioned first embodiment in terms of how the upper wall of the housing 12 is configured.

Simply put, while the upper wall of the housing 12 is constituted by the display panel 48 in the aforementioned first embodiment, the upper wall of the housing 12 is constituted by a common image reading device 130 and a common automatic document feed device 132 in the fifth embodiment. The image reading device 130 includes an image reading section including a light source, a plurality of mirrors, an imaging lens, a line sensor, and other components, and is disposed in an upper part of the interior of the housing 12. A document platen 134 formed by a transparent material is provided on an upper surface of the image reading device 130. Further, a document holding cover 136 provided with the automatic paper feed device 132, which automatically feeds documents one by one, is openably and closably attached on top of the document platen 134. Furthermore, although not illustrated, an operation section, such as a touch panel and an operation button, that accepts user operations of inputting a print instruction and other instructions is provided in front of the image reading device 130. Moreover, the paper output section 16 is disposed on the left face side of the interior of the housing 12. That is, in this fifth embodiment, an inner face side of a left wall 12b is used as the paper output tray 72.

As with the first embodiment, the fifth embodiment brings about improvement in convenience and aesthetic appearance of the image forming apparatus 10.

It should be noted that although each of the aforementioned embodiments has taken as an example of the image forming apparatus 10 a multifunctional printer that incorporates the functionality of a copier, a facsimile, a printer, and the like in one, the image forming apparatus 10 may alternatively be a multifunctional printer that incorporates the functionality of at least two of these in one.

Further, although those configuration changes to the first embodiment which are shown in the aforementioned second to fifth embodiments have been each individually described, technical features described in each separate embodiment or modification may be combined with each other.

Furthermore, the specific numerical values, the materials, and the like which have been mentioned above are mere examples and may be changed as appropriate in accordance with the requirements of the product specification or the like.

The present disclosure contains subject matter related to that disclosed in Japanese Priority Patent Application JP 2017-007196 filed in the Japan Patent Office on Jan. 19, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming apparatus comprising:
   a housing in which an image forming section that forms an image on a sheet of paper is contained; and
   a paper output section, provided in the housing, into which the sheet of paper on which the image has been formed is ejected,
   wherein the paper output section includes a paper output tray that supports the sheet of paper ejected into the paper output section and a paper takeout slot through which the sheet of paper is taken out,
   the housing has an external wall whose inner face side is used as the paper output tray,
   the paper takeout slot opens upward,
   the paper output tray includes an inclined portion that inclines toward an outside of the image forming apparatus, as the sheet of paper moves toward the paper takeout slot, and
   the inclined portion is partially formed in a central part of the housing in an up and down direction of the image forming apparatus.

2. The image forming apparatus according to claim 1, wherein the paper output tray is provided so as to extend in a substantially vertical direction.

3. The image forming apparatus according to claim 1, wherein the paper output tray is disposed on a front face side of the housing.

4. The image forming apparatus according to claim 1, wherein a length of the paper output tray in the paper ejection direction is set to be smaller than a length of a sheet of paper of a predetermined size in the paper ejection direction so that a leading end of the sheet of paper sticks out of the paper takeout slot.

5. The image forming apparatus according to claim 1, wherein the paper output tray has a depression extending along the paper ejection direction.

6. The image forming apparatus according to claim 5, wherein the depression has a width that becomes greater upward.

7. The image forming apparatus according to claim 5, wherein the depression has a depth that becomes greater upward.

8. The image forming apparatus according to claim 1, further comprising a paper holding section that holds the sheet of paper onto the paper output tray.

9. The image forming apparatus according to claim 1, wherein the housing has an upper wall provided so as to be movable in such directions as to contact and separate from the paper output tray.

10. The image forming apparatus according to claim 1, wherein the housing has an upper wall constituted by a display panel having an image reading function.

11. The image forming apparatus according to claim 1, wherein an image reading device for reading images of a placed document on a document placing table is provided on upper portion of the image forming apparatus.

12. The image forming apparatus according to claim 1, wherein the inclined portion further includes a curved part formed in the housing so that the central part is more recessed than both ends of the housing in a width direction toward the outside of the image forming apparatus.

* * * * *